(12) United States Patent
Smith

(10) Patent No.: US 7,003,098 B2
(45) Date of Patent: Feb. 21, 2006

(54) METHOD AND SYSTEM FOR MEASUREMENT OF THE DELAY THROUGH A NETWORK LINK BOUNDED BY AN ECHO CANCELLER

(75) Inventor: Wallace F. Smith, Sea Girt, NJ (US)

(73) Assignee: AT&T Corp., New York, NY (US)

( * ) Notice: Subject to any disclaimer, the term of this patent is extended or adjusted under 35 U.S.C. 154(b) by 249 days.

(21) Appl. No.: 10/739,458

(22) Filed: Dec. 17, 2003

(65) Prior Publication Data

US 2004/0228473 A1    Nov. 18, 2004

Related U.S. Application Data

(60) Provisional application No. 60/470,822, filed on May 15, 2003.

(51) Int. Cl.
*H04B 3/23* (2006.01)
(52) U.S. Cl. .............................. 379/406.02; 379/22.01; 370/252
(58) Field of Classification Search ............ 379/406.02
See application file for complete search history.

(56) References Cited

U.S. PATENT DOCUMENTS

| | | | |
|---|---|---|---|
| 3,499,999 A | | 3/1970 | Sondhi |
| 3,500,000 A | | 3/1970 | Kelly, Jr. et al. |
| 4,126,770 A | | 11/1978 | Sato et al. |
| 4,587,382 A | | 5/1986 | Yang |
| 5,450,394 A | * | 9/1995 | Gruber et al. ............... 370/253 |
| 5,521,907 A | * | 5/1996 | Ennis et al. ................. 370/253 |
| 6,058,102 A | * | 5/2000 | Drysdale et al. ............ 370/252 |

(Continued)

OTHER PUBLICATIONS

"Voice Echo Canceller Frequently Asked Questions", Zarlink Semiconductor Inc., ZLAN-56 Application Note, pp. 1-6, (Aug. 2003).

(Continued)

*Primary Examiner*—Daniel Swerdlow
(74) *Attorney, Agent, or Firm*—Hoffmann & Baron, LLP

(57) ABSTRACT

A method and system for measuring the signal transmission time through a network link bounded by at least one echo canceller. The method generally includes the steps of determining a signal transmission time (tA) along a network path including the network link bounded by the echo canceller between a first endpoint and a second endpoint, transmitting a test signal from the first endpoint to the second endpoint through the network path, transmitting an echo signal which simulates the test signal from the second endpoint to the first endpoint through the network path, measuring a minimum time delay between transmission of the test signal and transmission of the echo signal which causes the echo canceller to cancel the echo signal and calculating the signal transmission time through the network link bounded by the echo canceller based on the measured minimum time delay and the determined network path signal transmission time (tA). Where the network link is bounded by two echo cancellers, the method further includes the steps of transmitting a second test signal from the second endpoint to the first endpoint through the network path, transmitting a second echo signal which simulates the second test signal from the first endpoint to the second endpoint through the network path, measuring a second minimum time delay between transmission of the second test signal and transmission of the second echo signal which causes the second echo canceller to cancel the second echo signal and calculating the delay through the network link bounded between the first and second echo cancellers based on both measured minimum time delays and the determined network path signal transmission time (tA).

31 Claims, 4 Drawing Sheets

U.S. PATENT DOCUMENTS

| | | |
|---|---|---|
| 6,243,462 B1 | 6/2001 | Chujo et al. |
| 6,347,140 B1 | 2/2002 | Tahernezhaadi et al. |
| 6,400,802 B1 * | 6/2002 | Legare .......................... 379/3 |
| 6,590,975 B1 | 7/2003 | Ariyama |
| 6,606,382 B1 | 8/2003 | Gupta |
| 6,625,279 B1 | 9/2003 | Eom |
| 6,647,115 B1 | 11/2003 | Joffe |
| 6,831,890 B1 * | 12/2004 | Davis et al. ................ 370/252 |

OTHER PUBLICATIONS

Messerschmitt et al., "Digital Voice Echo Canceller with a TMS32020", Applications Report: SPRA 129, Texas Instruments, (1989).

* cited by examiner

METHOD AND SYSTEM FOR MEASUREMENT OF THE DELAY THROUGH A NETWORK LINK BOUNDED BY AN ECHO CANCELLER

CROSS-REFERENCE TO RELATED APPLICATIONS

This application claims the benefit of U.S. Provisional Application Ser. No. 60/470,822, filed May 15, 2003, the disclosure of which is incorporated herein by reference.

FIELD OF THE INVENTION

The present invention relates generally to communication systems and, more particularly, to a method and system for measurement of the time delay through a telecommunication system network link bounded by an echo canceller.

BACKGROUND OF THE INVENTION

Voice service providers are very concerned with analyzing and controlling the delay through the various links within their telecommunication networks. Connections with high delays disrupt natural conversation and cause any echo problems to be more pronounced. However, direct measurements of delay through any subsection of a connection are difficult at best and require equipment to be physically deployed at locations in the field at the boundaries of the link of interest. Such deployment is, except for the exceptional case, financially prohibitive.

Current techniques for measuring network delays from remote, centralized locations require multiple delay measurements on test calls that first include and then exclude the network link of interest. These techniques require the taking of the difference between the two delays to calculate the link delay. These techniques are prone to error since the same call route is not guaranteed on each call. Moreover, excluding only the link of interest may be difficult.

Accordingly, in addition to the common measurement of end to end delay, it would be desirable to measure the delay through various links in a correction to thoroughly characterize networks and to identify and solve problems associated with delay.

SUMMARY OF THE INVENTION

The present invention is a method for measuring the signal transmission time through a network link bounded by at least one echo canceller. The method generally includes the steps of determining a signal transmission time along a network path including the network link bounded by the echo canceller between a first endpoint and a second endpoint (tA), transmitting a test signal from the first endpoint to the second endpoint through the network path, transmitting an echo signal which simulates the test signal from the second endpoint to the first endpoint through the network path, measuring a minimum time delay between transmission of the test signal and transmission of the echo signal which causes the echo canceller to cancel the echo signal and calculating the signal transmission time through the network link bounded by the echo canceller based on the measured minimum time delay and the determined network path signal transmission time (tA).

The network link of interest can be any link in the network path bounded by the echo canceller, including the link between the echo canceller and the first network path endpoint and the link between the echo canceller and the second network path endpoint. One link of particular interest today is the packet network link of a voice call connection.

Preferably, the test signal and the echo signal are transmitted and the minimum time delay is measured remote from the network link by at least one test apparatus capable of playing and recording digital files. The echo signal test apparatus further preferably varies the delay between transmission of the test signal and transmission of the echo signal from 0 msec to a value equal to the signal transmission time along the network path (tA) and the echo signal is recorded at the first network path endpoint for each value of the delay until echo cancellation has occurred.

In a preferred embodiment, the network link of interest is bounded between two echo cancellers. In this case, the method according to the present invention generally includes the steps of determining a signal transmission time along a network path including a network link bounded between a first echo canceller and a second echo canceller between a first endpoint and a second endpoint (tA), transmitting a first test signal from the first endpoint to the second endpoint through the network path, transmitting a first echo signal which simulates the first test signal from the second endpoint to the first endpoint through the network path, measuring a first minimum time delay between transmission of the first test signal and transmission of the first echo signal which causes the first echo canceller to cancel the first echo signal, transmitting a second test signal from the second endpoint to the first endpoint through the network path, transmitting a second echo signal which simulates the second test signal from the first endpoint to the second endpoint through the network path, measuring a second minimum time delay between transmission of the second test signal and transmission of the second echo signal which causes the second echo canceller to cancel the second echo signal and calculating the delay through the network link bounded between the first and second echo cancellers based on the measured first and second minimum time delays and the determined network path signal transmission time (tA).

The present invention further involves a system for measuring the signal transmission time through a network link bounded by at least one echo canceller. The system generally includes a network path having a first endpoint, a second endpoint and a network link bounded by an echo canceller, a test apparatus connected to the first network path endpoint for transmitting a test signal from the first endpoint to the second endpoint through the network path and a test apparatus connected to the second network path endpoint for transmitting an echo signal which simulates the test signal from the said second endpoint to the first endpoint through the network path. The test apparatus connected to the first network path endpoint further records a minimum time delay between transmission of the test signal and transmission of the echo signal which causes the echo canceller to cancel the echo signal. The minimum time delay is then used to calculate the signal transmission time through the network link bounded by the echo canceller. Again, the test apparatus is preferably connected to the network path remote from the network link and is capable of playing and recording digital files.

Also, in a preferred embodiment, the network path includes a network link bounded between a first and a second echo canceller. In this embodiment, the test apparatus connected to the second network path endpoint further transmits a second test signal from the second endpoint to the first endpoint through the network path and the test apparatus connected to the first network path endpoint further transmits a second echo signal from the first endpoint to the second endpoint through the network path. The second echo signal simulates the second test signal and the test apparatus connected to the second network path endpoint records a second minimum time delay between transmission of the second test signal and transmission of the second echo signal which causes the second echo canceller to cancel the second echo signal. The second minimum time delay is then used to calculate the signal transmission time through the network link bounded between the first and second echo cancellers.

As a result of the present invention, a method and system for remotely measuring the delay through any subsection of a call connection bounded by echo cancellers is provided. This invention performs all required measurements on a single call and precisely isolates the link of interest to measure its delay. All measurements are performed remotely, thus eliminating deployment of equipment and providing great flexibility in the routing of calls. One application of this method that is of great interest today is the measurement of delay through the packet network (IP) link of a voice call connection, which is typically bounded by echo cancellers.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 1:
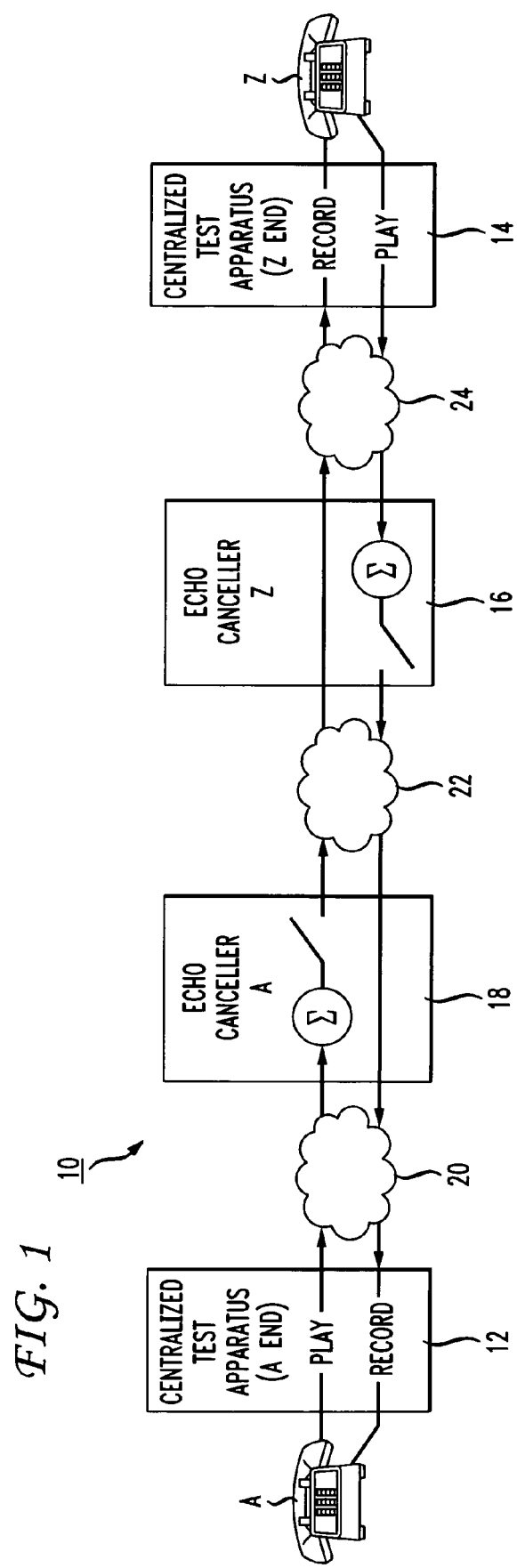
FIG. 1 is a block diagram of a system, formed in accordance with the present invention, for measuring the time delay through a telecommunication system network link bounded by an echo canceller.

FIG. 1 shows a telecommunications network path 10 between a first endpoint A and a second endpoint Z. Connected to network path endpoint A is a centralized test apparatus 12 and connected to network path endpoint Z is a centralized test apparatus 14. Preferably, the test apparatus 12, 14 is capable of playing and recording digital files. The network path 10 shown in FIG. 1 begins at a near end A and terminates at a far end Z. However, the path 10 may be a loop beginning and terminating at the same point, wherein only one piece of test apparatus connected to each network path endpoint A and Z would be required.

Figure 2:
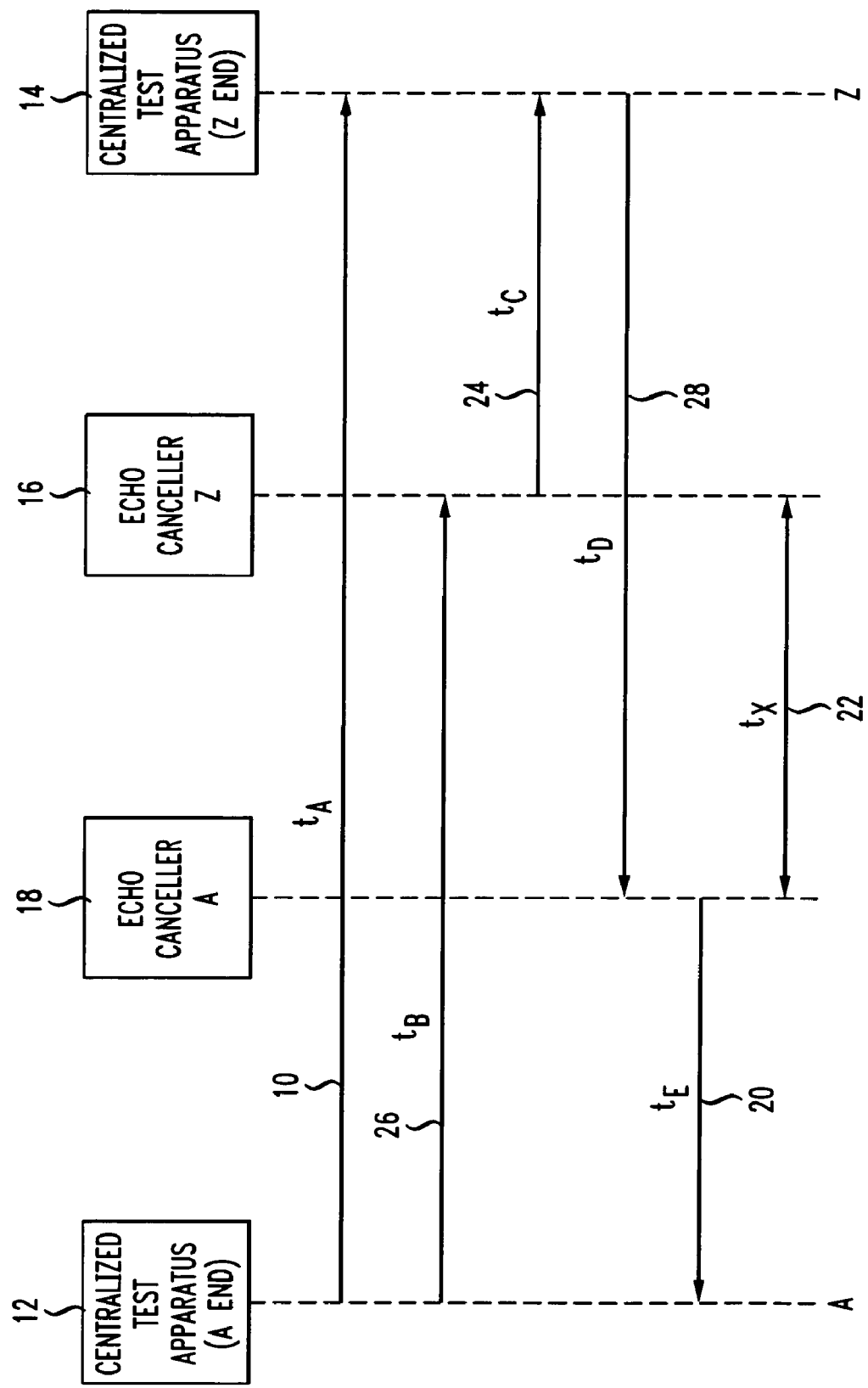
FIG. 2 is a schematic diagram showing the signal transmission times between various points of the system shown in FIG. 1.

Referring additionally to FIG. 2, the network path 10 includes at least one echo canceller 16, 18 and a number of network links 20, 22, 24, 26, 28 bounded by an echo canceller between the path endpoints A and Z. In a preferred embodiment of the present invention, the network path 10 includes a first echo canceller 16, a second echo canceller 18 and a network link 22 bounded between the first and second echo cancellers. The method and system according to the present invention determines the signal transmission time through any or all of the network links 20, 22, 24, 26, 28.

Briefly, a series of echo measurements is performed as the test apparatus 12, 14 vary the echo path delay. The delays from each of the test terminations to each of the echo cancellers (EC) 16, 18 of interest are derived from the echo measurements. The delay through any link bounded by an echo canceller can be calculated from the test termination based on the EC delays.

More specifically, the steps of the present invention are as follows. First, a call through the network path 10 is established. The network path 10 includes the link of interest bounded by at least one echo canceller 16, 18 between endpoints A and Z. The call path 10 also includes centralized test equipment 12, 14 at both the originating and terminating ends of the call as described above. Upon establishing the call path, the overall signal transmission time between endpoints A and Z (tA) can be determined in a conventional manner.

Figure 3:
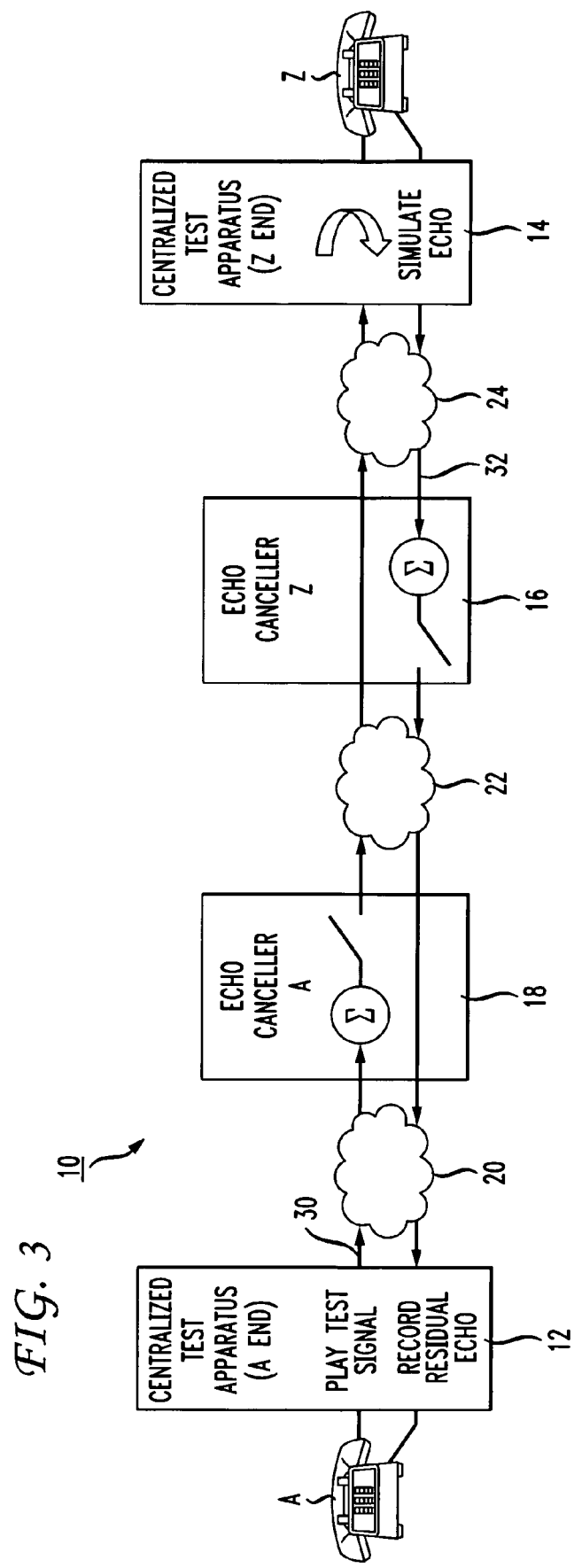
FIG. 3 is a block diagram of the system shown in FIG. 1 showing a test signal being transmitted in a forward direction.

Next, a series of test measurements is performed. Referring now to FIG. 3, a first test signal 30 is played from the A end test apparatus 12 and a first echo signal 32 is played from the Z end test apparatus 14. The first echo signal 32 simulates in all respects the first test signal 30 so that the first echo canceller 16 perceives the first echo signal as the echo of the first test signal. Transmission of the simulated first echo signal 32 is delayed relative to transmission of the first test signal 30 by a time Dt. Dt is swept from 0 msec to a value equal to the one way delay through the test network path 10 from endpoint A to endpoint Z. The minimum Dt for which the first echo canceller (EC Z) 16 cancels the echo signal 32 is recorded.

Those skilled in the art will appreciate that the first echo canceller (EC Z) 16 will not begin to cancel the first echo signal 32 until it has detected the first test signal 30. Therefore, echo cancellation at the first echo canceller (EC Z) 16 will start only when the delay in transmission between the first test signal 30 and the first echo signal 32 causes the first test signal to arrive at the first echo canceller at the same time as the first echo signal. By recording the minimum delay in transmission between the first test signal 30 and the first echo signal 32 which causes echo cancellation, the relative location of the first echo canceller (EC Z) 16 can be determined. Once the relative location of the first echo canceller (EC Z) 16 is determined, the signal transmission time through a link 26 between the first endpoint (A) 12 and the first echo canceller (EC Z) 16, as well as the signal transmission time through a link 24 between the first echo canceller (EC Z) 16 and the second endpoint (Z) 14 can be calculated.

Figure 4:
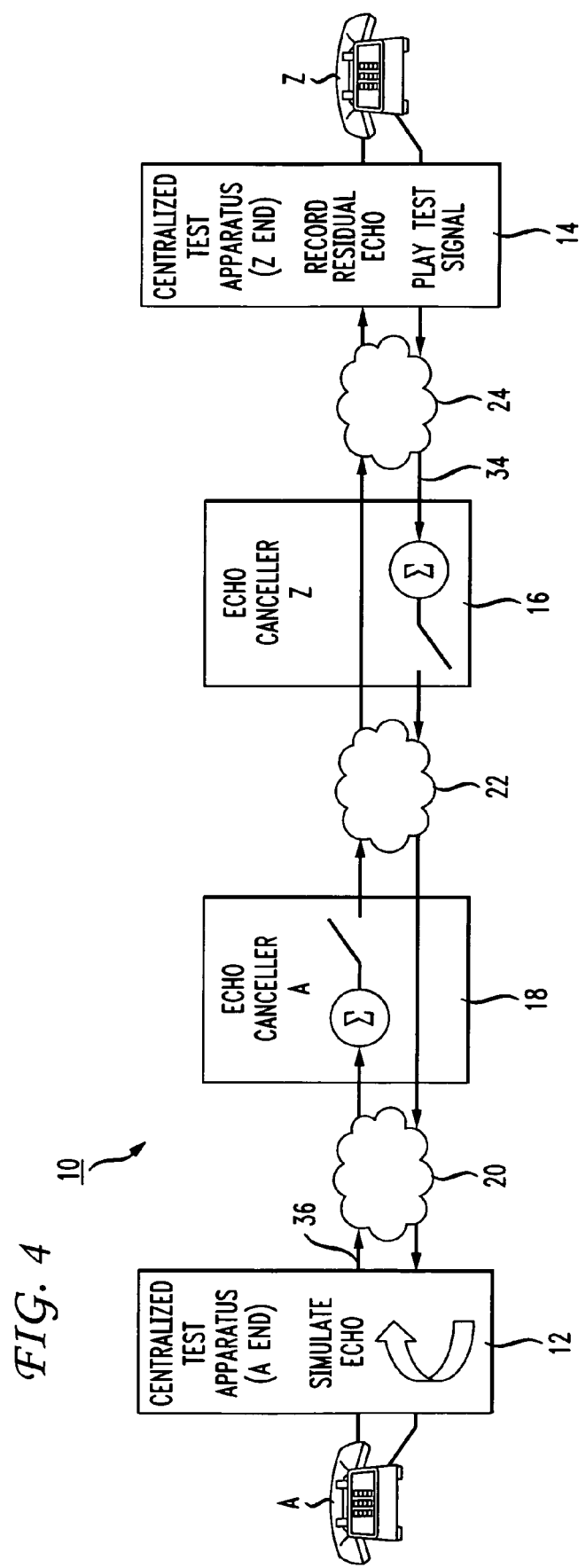
FIG. 4 is a block diagram of the system shown in FIG. 1 showing a test signal being transmitted in a reverse direction.

Typically, however, it is the network link 22 that is bounded by two echo cancellers 16 and 18 within the network path 10 where the measurement of signal transmission time delays is most desired. In this case, a second series of test measurements is performed, as shown in FIG. 4. A second test signal 34 is played from the Z end test apparatus 14 and a second echo signal 36, which simulates the second test signal, is played from the A end test apparatus 12. Transmission of the second simulated echo signal 36 is delayed relative to transmission of the second test signal 34 by a second time Dt. Dt is swept from 0 msec to a value equal to the one way delay through the test network path (tA) and the minimum Dt at which the second echo canceller (EC A) 18 cancels the second echo signal 36 is recorded, as described above.

With the second series of test measurements, the relative location of the second echo canceller (EC A) 18 can be determined and the signal transmission time through a link 20 between the first endpoint (A) 12 and the second echo canceller (EC A) 18, as well as the signal transmission time through a link 28 between the second echo canceller (EC A) 16 and the second endpoint (Z) 14 can be calculated. By calculating the signal transmission time through each component link of the network path, the signal transmission time or delay through the network link 22 between the echo cancellers 16 and 18 can be easily derived mathematically.

The foregoing can further be described mathematically as follows. A call is established in accordance with FIG. 1 and an overall network path signal transmission time (tA) is determined. Signal transmission times (tA, tB, tC, tD, tE, and tF) for the network path 10 are presented in FIG. 2 and defined as follows: tA is the signal transmission time through the network path 10 from the A end test apparatus 12 to the Z end test apparatus 14; tB is the signal transmission time through link 26 from the A end test apparatus 12 to the first echo canceller (EC Z) 16; tC is the signal transmission time through link 24 from the first echo canceller (EC Z) 16 to the Z end test apparatus 14; tD is the signal transmission time through link 28 from the Z end test apparatus 14 to the second echo canceller (EC A) 18; tE is the signal transmission time through link 20 from the second echo canceller (EC A) 18 to the A end test apparatus 12; and tX is the signal transmission time through link 22 from the first echo canceller (EC Z) 16 to the second echo canceller (EC A) 18.

As described above and shown in FIG. 3, a first test signal 30 is played from the A end of the test connection 12 and a simulated first echo signal 32 is played from the Z end 14. Transmission of the first simulated echo signal 32 is delayed relative to transmission of the test signal by a time Dt. Dt is swept from 0 msec to a value equal to the one way delay through the test network (tA) and for each value of Dt, the residual echo is recorded at the A end 12 until the minimum value of Dt for which echo cancellation occurs at the first echo canceller (EC Z) 16 is recorded.

As described above and shown in FIG. 4, a second test signal 34 is played from the Z end of the test connection 14 and a simulated second echo signal 36 is played from the A end 12. Transmission of the simulated second echo signal 36 is delayed relative to transmission of the second test signal 34 by a time Dt. Dt is swept from 0 msec to tA and the minimum value of Dt for which echo cancellation occurs at the second echo canceller (EC A) 18 is recorded.

The second echo canceller (EC A) 18 will cancel echo for values of Dt between (tD−tE) and (tD−tE+EC A tail coverage). This corresponds to echo path delays (EPDs) between 0 msec and the tail delay coverage for the second echo canceller (EC A) 18. The first echo canceller (EC Z) 16 will cancel echo for values of Dt between (tB−tC) and (tB−tC+EC Z tail coverage). This corresponds to echo path delays (EPDs) between 0 msec and the tail delay coverage for the first echo canceller (EC Z).

As made clear in FIG. 2, the values of tB (link 26) and tE (link 20) or the values of tC (link 24) and tD (link 28) must be determined to calculate the delay tX (link 22) from the first echo canceller (EC Z) 16 to the second echo canceller (EC A). These values can be determined as follows. The minimum Dt for which the second echo canceller (EC A) 18 cancels echo equals tD−tE. The transmission delay tA between the A and Z test apparatus 12 and 14 is equal to tD+tE. Therefore, tD=tA−tE, and the minimum Dt for which the second echo canceller (EC A) 18 cancels echo is equal to (tA−tE)−tE. Accordingly, tE=(tA−minimum Dt for EC A)/2.

The minimum Dt for which the first echo canceller (EC Z) 16 cancels echo equals tB−tC. The transmission delay tA between the A and Z test apparatus 12 and 14 is equal to tB+tC. Therefore, tC=tA−tB, and the minimum Dt for which the first echo canceller (EC Z) cancels echo=tB−(tA−tB). Accordingly, tB=(minimum Dt for EC Z+tA)/2. Finally, the delay tX between the first echo canceller (EC Z) and the second echo canceller (EC A) is the signal transmission time tB from the A end test apparatus 12 to the first echo canceller (EC Z) minus the signal transmission time tD from the Z end test apparatus 14 to the second echo canceller (EC A) or tB−tE, which simplifies to (minimum Dt for (EC Z)+minimum Dt for (EC A))/2.

As a result of the present invention, a new and unique process of precisely measuring the delay through a link within a call connection from a remote centralized location is provided. The method according to the present invention precludes the need for the special deployment of test equipment in the field and eliminates the multiple delay measurements on test calls required with conventional remote location monitoring. The present invention addresses the long felt need for a means of precisely measuring the delay through network links for purposes of characterization, monitoring, and troubleshooting of problems associated with delay without deploying test equipment in the field.

While there has been described what is presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for measuring the signal transmission time through a network link bounded by an echo canceller comprising the steps of:
   determining a signal transmission time along a network path between a first endpoint and a second endpoint (tA), said network path including said network link bounded by said echo canceller;
   transmitting a test signal from said first endpoint to said second endpoint through said network path;
   transmitting an echo signal from said second endpoint to said first endpoint through said network path, said echo signal simulating said test signal;
   measuring a minimum time delay between transmission of said test signal and transmission of said echo signal which causes said echo canceller to cancel said echo signal; and
   calculating the signal transmission time through said network link bounded by said echo canceller based on said measured minimum time delay and said determined network path signal transmission time (tA).

2. A method as defined in claim 1, wherein said network link is between said echo canceller and said first network path endpoint.

3. A method as defined in claim 1, wherein said network link is between said echo canceller and said second network path endpoint.

4. A method as defined in claim 1, wherein said network link is a packet network link of a voice call connection.

5. A method as defined in claim 1, wherein said minimum time delay is measured remote from said network link.

6. A method as defined in claim 1, wherein said test signal and said echo signal are transmitted by at least one test apparatus capable of playing and recording digital files.

7. A method as defined in claim 6, wherein said echo signal test apparatus varies the delay between transmission of said test signal and transmission of said echo signal.

8. A method as defined in claim 7, wherein the delay between transmission of said test signal and transmission or said echo signal is swept from 0 msec to a value equal to said signal transmission time along said network path (tA).

9. A method as defined in claim 7, wherein said echo signal is recorded at said first network path endpoint for each value of said delay until echo cancellation has occurred.

10. A method as defined in claim 1, further comprising the steps of:
  transmitting a second test signal from said second endpoint to said first endpoint through said network path;
  transmitting a second echo signal from said first endpoint to said second endpoint through said network path, said second echo signal simulating said second test signal;
  measuring a second minimum time delay between transmission of said second test signal and transmission of said second echo signal which causes a second echo canceller to cancel said second echo signal; and
  calculating the signal transmission time through said network link based on said measured second minimum time delay and said determined network path signal transmission time (tA), wherein said network link is further bounded by said second echo canceller.

11. A method as defined in claim 10, further comprising the step of calculating the signal transmission time between said second echo canceller and said first network path endpoint.

12. A method as defined in claim 10, further comprising the step of calculating the signal transmission time between said second echo canceller and said second network path endpoint.

13. A method for measuring the delay through a network link bounded between a first and a second echo canceller comprising the steps of:
  determining a signal transmission time along a network path between a first endpoint and a second endpoint (tA), said network path including said network link bounded between said first and second echo cancellers;
  transmitting a first test signal from said first endpoint to said second endpoint through said network path;
  transmitting a first echo signal from said second endpoint to said first endpoint through said network path, said first echo signal simulating said first test signal;
  measuring a first minimum time delay between transmission of said first test signal and transmission of said first echo signal which causes said first echo canceller to cancel said first echo signal;
  transmitting a second test signal from said second endpoint to said first endpoint through said network path;
  transmitting a second echo signal from said first endpoint to said second endpoint through said network path, said second echo signal simulating said second test signal;
  measuring a second minimum time delay between transmission of said second test signal and transmission of said second echo signal which causes said second echo canceller to cancel said second echo signal; and
  calculating the delay through said network link bounded between said first and second echo cancellers based on said measured first and second minimum time delays and said determined network path signal transmission time (tA).

14. A method as defined in claim 13, further comprising the step of calculating the signal transmission time between said first network path endpoint and said first echo canceller based on said measured first minimum time delay and said network path signal transmission time (tA).

15. A method as defined in claim 13, further comprising the step of calculating the signal transmission time between said second network path endpoint and said first echo canceller based on said measured first minimum time delay and said network path signal transmission time (tA).

16. A method as defined in claim 13, further comprising the step of calculating the signal transmission time between said first network path endpoint and said second echo canceller based on said measured second minimum time delay and said network path signal transmission time (tA).

17. A method as defined in claim 13, further comprising the step of calculating the signal transmission time between said second network path endpoint and said second echo canceller based on said measured second minimum time delay and said network path signal transmission time (tA).

18. A method as defined in claim 13, wherein said network link is a packet network link of a voice call connection.

19. A method as defined in claim 13, wherein said first and second minimum time delays are measured remote from said network link.

20. A method as defined in claim 13, wherein said first and second test and echo signals are transmitted by at least one test apparatus capable of playing and recording digital files.

21. A method as defined in claim 13, wherein said echo signal test apparatus varies the delay between transmission of said first and second test signals and transmission of said first and second echo signals.

22. A method as defined in claim 21, wherein said first and second delays are swept from 0 msec to a value equal to said signal transmission time along said network path (tA).

23. A system for measuring the signal transmission time through a network link bounded by an echo canceller comprising:
  a network path having a first endpoint, a second endpoint and a network link bounded by an echo canceller;
  a test apparatus connected to said first network path endpoint for transmitting a test signal from said first endpoint to said second endpoint through said network path; and
  a test apparatus connected to said second network path endpoint for transmitting an echo signal from said second endpoint to said first endpoint through said network path, said echo signal simulating said test signal,
  wherein said test apparatus connected to said first network path endpoint records a minimum time delay between transmission of said test signal and transmission of said echo signal which causes said echo canceller to cancel said echo signal, said minimum time delay being used to calculate the signal transmission time through said network link bounded by said echo canceller.

24. A system as defined in claim 23, wherein said network link is a packet network link of a voice call connection.

25. A system as defined in claim 23, wherein said test apparatus connected to said first network path endpoint is remote from said network link.

26. A system as defined in claim 23, wherein said test apparatus is capable of playing and recording digital files.

27. A system as defined in claim 23, wherein said test apparatus connected to said second network path endpoint varies the delay between transmission of said test signal and transmission of said echo signal.

28. A system as defined in claim 27, wherein said test apparatus connected to said second network path endpoint sweeps said delay from 0 msec to a value equal to a signal transmission time along said network path between said first and second endpoints (tA).

29. A system as defined in claim 28, wherein said test apparatus connected to said first network path endpoint records said echo signal for each value of said delay until echo cancellation has occurred.

30. A system as defined in claim 23, wherein said network path includes a network link bounded between a first and a second echo canceller.

31. A system as defined in claim 30, wherein said test apparatus connected to said second network path endpoint further transmits a second test signal from said second endpoint to said first endpoint through said network path and said test apparatus connected to said first network path endpoint further transmits a second echo signal from said first endpoint to said second endpoint through said network path, said second echo signal simulating said second test signal, and wherein said test apparatus connected to said second network path endpoint records a second minimum time delay between transmission of said second test signal and transmission of said second echo signal which causes said second echo canceller to cancel said second echo signal, said second minimum time delay being used to calculate the signal transmission time through said network link bounded between said first and second echo cancellers.

* * * * *

UNITED STATES PATENT AND TRADEMARK OFFICE
CERTIFICATE OF CORRECTION

| | | |
|---|---|---|
| PATENT NO. | : 7,003,098 B2 | Page 1 of 1 |
| APPLICATION NO. | : 10/739458 | |
| DATED | : February 21, 2006 | |
| INVENTOR(S) | : Wallace F. Smith | |

It is certified that error appears in the above-identified patent and that said Letters Patent is hereby corrected as shown below:

Column 1, line 42,      now reads "links in a correction to"
should read --links in a connection to--

Signed and Sealed this

Twenty-fifth Day of July, 2006

JON W. DUDAS
*Director of the United States Patent and Trademark Office*